United States Patent [19]
Nakase et al.

[11] Patent Number: 4,910,796
[45] Date of Patent: Mar. 20, 1990

[54] AUTOMOBILE ANTENNA

[75] Inventors: Kazuhiko Nakase, Tokyo; Yuzo Yamamoto, Sagamihara, both of Japan

[73] Assignee: Harada Kogyo Kabushiki Kaisha, Tokyo, Japan

[21] Appl. No.: 87,436

[22] Filed: Aug. 19, 1987

[30] Foreign Application Priority Data

Sep. 1, 1986 [JP] Japan ................................ 61-205516
Nov. 28, 1986 [JP] Japan ................................ 61-283987

[51] Int. Cl.$^4$ ........................... H04B 1/08; H01Q 1/32
[52] U.S. Cl. ..................................... 455/197; 455/340; 343/711; 343/713; 343/850
[58] Field of Search ................................ 343/711-713, 343/850; 455/150-152, 193, 197, 345, 352, 297, 340, 266, 295

[56] References Cited

U.S. PATENT DOCUMENTS

| | | | |
|---|---|---|---|
| 4,132,951 | 1/1979 | Cochran et al. | 455/340 |
| 4,247,954 | 1/1981 | Sauer | 343/713 |
| 4,334,323 | 6/1982 | Moore | 455/340 |
| 4,531,232 | 7/1985 | Sakurai | 455/152 |

FOREIGN PATENT DOCUMENTS

| | | | |
|---|---|---|---|
| 447684 | 4/1948 | Canada | 455/151 |
| 1015057 | 8/1977 | Canada | 343/713 |
| 124055 | 11/1984 | European Pat. Off. | 343/713 |
| 2425189 | 12/1974 | Fed. Rep. of Germany | 343/713 |
| 56-19240 | 2/1981 | Japan | 455/297 |
| 27538 | 3/1981 | Japan | 455/193 |

*Primary Examiner*—Rolf Hille
*Assistant Examiner*—Michael C. Wimer
*Attorney, Agent, or Firm*—Koda & Androlia

[57] ABSTRACT

An automobile antenna including a high frequency signal processing unit provided near an antenna where the processing unit only tunes in a designated frequency band and amplifies it and further detects the amplified signal. The high frequency signal processing unit also adjusts the tuned frequency band at the high frequency signal processing unit based upon a tracking signal sent from an automobile receiver. Since the high frequency signal processing unit is provided adjacent to antennas, that is, near a glass antenna or mounted on an antenna mast, a loss which occur between the antenna and the receiver can be fully compensated for and noise interference can be avoided.

5 Claims, 1 Drawing Sheet

AUTOMOBILE ANTENNA

BACKGROUND OF THE INVENTION

1. Field of the Invention

The present invention relates to an automobile antenna.

2. Prior Art

A conventional automobile antenna is mounted on a trunk lid, etc. of a vehicle, and a high frequency signal is transmitted from the antenna to a receiver installed in the vehicle through feeders. In this case, due to the so-called C splitting effect, a loss of about 10–20 dB usually occurs. In order to compensate for this loss, a booster amplifier, which is a broad-band amplifier, is provided on the antenna mast.

However, when the signal level from a selected station is low and the signal level from an interfering station is high, the use of a broad-band amplifier causes problems such as cross modulation distortion.

SUMMARY OF THE INVENTION

Accordingly, the present invention was made in view of the problems of the prior art devices.

It is, therefore, a primary object of the present invention to provide an automobile antenna which can compensate for the loss which occurs between the antenna and a receiver of the vehicle.

It is another object of the present invention to provide an automobile antenna which has highly effective receiving sensitivity and prevents cross modulation distortion.

In keeping with the principles of the present invention, the objects are accomplished with a unique structure for an automobile antenna which includes a high frequency signal processing unit which is provided near antennas, and more particularly near a glass type antenna or on an antenna mast and tunes in and amplifies only a designated frequency band and detects the thus amplified output signal. The frequency band to be amplified is controlled by the high frequency signal processing unit based upon a selection signal sent from a tuner/amplifier of the vehicle.

BRIEF DESCRIPTION OF THE DRAWINGS

The above mentioned features and objects of the present invention will become more apparent with reference to the following description taken in conjunction with the accompanying drawings wherein like reference numerals denote like elements and in which.

DETAILED DESCRIPTION OF THE INVENTION

Figure 1:
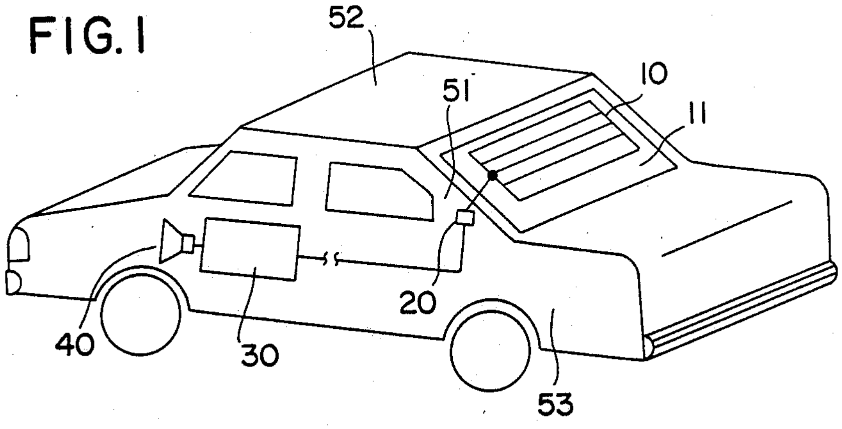
FIG. 1 is an illustration showing an embodiment of the present invention.

FIG. 1 illustrates an embodiment of an automobile antenna according to the present invention.

A high frequency signal processing unit 20 is a circuit which amplifies only a designated frequency band and detects the thus amplified signal. This high frequency signal processing unit 20 is disposed at a location in close proximity to a glass antenna which is mounted on a rear windshield of a vehicle. Practically, the high frequency signal processing unit 20 is provided on a rear pillar 51 of the vehicle. Furthermore, the high frequency signal processing unit 20 controls the frequency to be amplified in accordance with a selection signal received from a tuner/amplifier 30.

Figure 2:
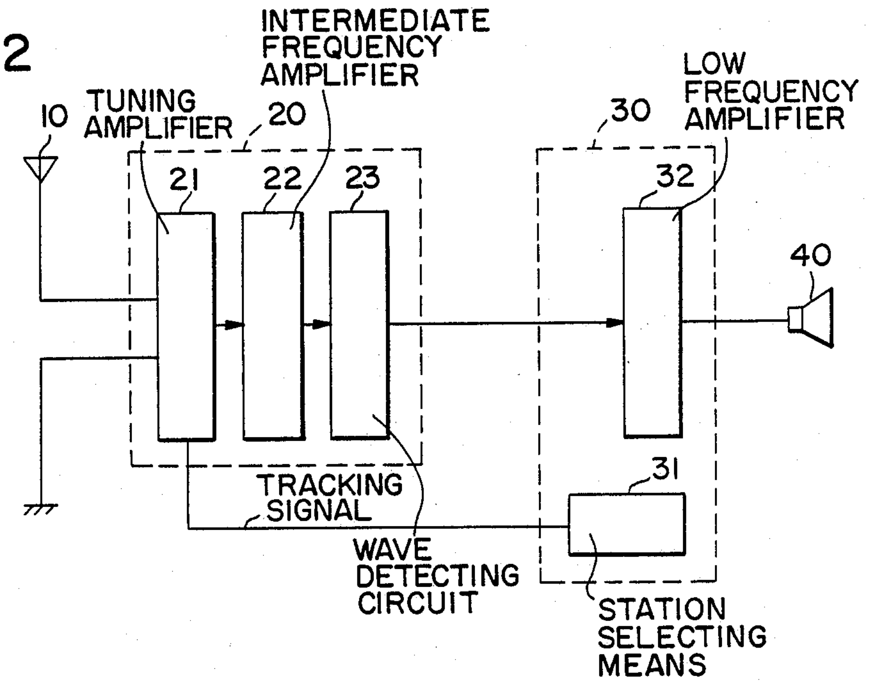
FIG. 2 is a block diagram of the above embodiment.

FIG. 2 is a circuit diagram which shows the embodiment of FIG. 1 in a more concrete manner.

In terms of its function, the high frequency signal processing unit 20 includes a tuning amplifier 21, an intermediate frequency amplifier 22 and a wave detecting circuit 23. The tuning amplifier 21 changes its tuning frequency based upon a capacity change in a varactor diode and constitutes a part of an electronic tuner. Furthermore, the tuning amplifier 21 selectively amplifies signals at the tuning frequency.

The tuner/amplifier 30 includes a station selecting means 31 and a low frequency amplifier 32. The station selecting means 31 adjusts and outputs DC voltage, and the thus outputted DC voltage is sent to the tuning amplifier 21 of the high frequency signal processing unit 20 as a tuning frequency selection signal. Depending upon the outputted voltage, the tuning frequency is determined. Thus, the station selecting means 31 and the tuning amplifier 21 constitute an electronic tuner.

The intermediate frequency amplifier 22, the wave detecting circuit 23 and the low frequency amplifier 32 are all ordinary components. A speaker 40 is operated by the low frequency amplifier 32.

The thus structured embodiment functions as follows. When the power source is turned on and the dial of the station selecting means 31 is turned, the station selecting means 31 outputs a DC voltage which corresponds to the position of the dial. According to the outputted DC voltage, a tuning circuit section of the tuning amplifier 21 is tuned to a designated frequency.

Thus, the tuned frequency band width is narrower than that of a conventional booster amplifier and therefore, cross modulation is less likely to occur. As a result, even if the signal receiving level of the selected (tuned) station is low and that of the interfering station is high, cross modulation distortion is low. Further, since high frequency amplifying is done in the tuning amplifier 21, losses between the antenna 10 and the receiver can be fully compensated for.

In addition, because the signal which is output by the high frequency signal processing unit 20 is very low in frequency, loss and noise interference between the high frequency signal processing unit 20 and the tuner/amplifier 30 is very low. In other words, the loss and noise interference between the antenna 10 and the tuner/amplifier 30 is very low.

In the above described embodiment, the high frequency signal processing unit 20 is installed on the rear pillar 51. The high frequency signal processing unit 20 may be installed at a location in close proximity to the glass antenna 10, such as on the rear windshield 11, the rooftop 52 or rear fender 53.

Figure 3:
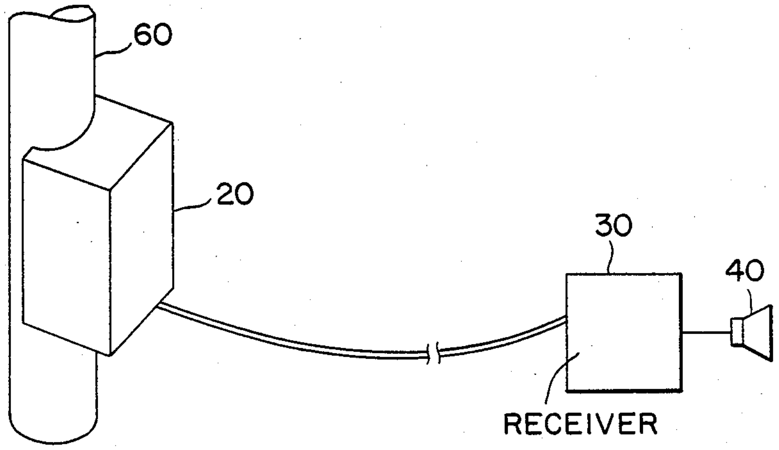
FIG. 3 is an illustration of another embodiment of the present invention.

FIG. 3 shows another embodiment of the present invention. In this embodiment the high frequency signal processing unit 20 is mounted on an antenna mast 60 and adjusts the frequency band, which is to be amplified, in accordance with a tracking signal sent from the tuner/amplifier 30. The antenna shown therein is a rod antenna or a spoiler antenna.

As mentioned above and in accordance with the present invention, the loss which occurs between the automobile antenna and the receiver can be fully compensated for. At the same time, the effective receiving sensitivity can be increased and cross modulation distortion does not occur.

It should be apparent to those skilled in the art that the above described embodiments are merely illustrative of the many possible specific embodiments which represent applications of the principles of the present invention. Numerous and varied other arrangements can be readily devised by those skilled in the art without departing from the spirit and scope of the invention

We claim:

1. An automobile antenna system comprising:

an antenna mounted on an automobile;

a tuner and amplifier means comprising a tuning frequency selecting means for selecting a frequency to be received and for generating a selection signal indicative of a tuning frequency selected, and a low frequency amplifier; and a high frequency signal processing means provided adjacent said antenna and remote from said tuner and amplifier means, said high frequency signal processing means having a first input coupled to said automobile antenna and a second input coupled to an output of said tuning frequency selecting means for tuning in and amplifying said tuning frequency selected, said high frequency signal processing means comprising:

a tuning amplifier having a narrow radio frequency band width and coupled to said tuning frequency selecting means for receiving said selection signal, said tuning amplifier varying a tuning frequency to correspond with said selected tuning frequency in response to said selection signal;

an intermediate frequency amplifier for receiving and amplifying an output signal of said tuning amplifier; and a wave detection circuit for receiving an output signal of said intermediate frequency amplifier and supplying an output low frequency signal to said low frequency amplifier;

whereby an automobile antenna system with low loss between the antenna tuner and amplifier means, with high receiving sensitivity and low cross modulation distortion is provided.

2. An automobile antenna system according to claim 1, wherein said high frequency signal processing means is provided adjacent to a glass antenna in an automobile.

3. An automobile antenna according to claim 1, wherein said high frequency signal processing means is provided on a rear pillar of an automobile.

4. An automobile antenna according to claim 1, wherein said high frequency signal processing means is provided adjacent a rear windshield of an automobile.

5. An automobile antenna system according to claim 1, wherein said high frequency signal processing means is mounted on a support of said antenna which is provided on an automobile.

* * * * *